(12) United States Patent
Tanaka et al.

(10) Patent No.: US 11,269,464 B2
(45) Date of Patent: Mar. 8, 2022

(54) ELECTRONIC PEN AND CARTRIDGE FOR ELECTRONIC PEN

(71) Applicant: Wacom Co., Ltd., Saitama (JP)

(72) Inventors: Kohei Tanaka, Saitama (JP); Hiroyuki Fujitsuka, Saitama (JP); Kenichi Ninomiya, Saitama (JP); Takenori Kaneda, Saitama (JP); Gunji Ishihara, Saitama (JP); Takashi Yamaguchi, Saitama (JP); Taketoshi Ito, Saitama (JP); Shuanglei Li, Beijing (CN)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/230,896

(22) Filed: Apr. 14, 2021

(65) Prior Publication Data

US 2021/0232261 A1    Jul. 29, 2021

Related U.S. Application Data

(63) Continuation of application No. 16/809,342, filed on Mar. 4, 2020, now Pat. No. 11,010,002, which is a
(Continued)

(30) Foreign Application Priority Data

Sep. 5, 2017 (JP) .............................. JP2017-170107

(51) Int. Cl.
*G06F 3/044* (2006.01)
*G06F 3/0354* (2013.01)
*G06F 3/038* (2013.01)

(52) U.S. Cl.
CPC .......... *G06F 3/0442* (2019.05); *G06F 3/0383* (2013.01); *G06F 3/03545* (2013.01); *G06F 3/0441* (2019.05)

(58) Field of Classification Search
CPC .... G06F 3/04883; G06F 3/04845; G06F 3/20; G06K 9/222; B29C 65/1635
(Continued)

(56) References Cited

U.S. PATENT DOCUMENTS

2013/0193532 A1* 8/2013 Horie ........................ G01L 9/12
257/415
2014/0029156 A1* 1/2014 Obata .................... G01B 7/003
361/270
(Continued)

FOREIGN PATENT DOCUMENTS

| JP | 2013-156066 A | 8/2013 |
| JP | 2013-161307 A | 8/2013 |
| WO | 2017/010336 A1 | 1/2017 |

OTHER PUBLICATIONS

International Search Report, dated Jul. 10, 2018, for International Application No. PCT/JP2018/022497, 2 pages.

*Primary Examiner* — Mark Edwards
(74) *Attorney, Agent, or Firm* — Seed IP Law Group LLP

(57) ABSTRACT

An electronic pen includes a tubular casing, and a first coupling member and a second coupling member that are coupled to each other in a hollow portion of the casing in an axial direction of the casing. In the axial direction, the first coupling member and the second coupling member are coupled to each other, and in a coupling portion between the first coupling member and the second coupling member, a welded portion that attaches the first coupling member and the second coupling member to each other is formed. The first coupling member is coupled to a core. The second coupling member holds a printed circuit board. The core of the core-side component is made of a conductive material. The second coupling member includes a conductor that
(Continued)

supplies, to the core, a signal from a signal transmitting circuit on the printed circuit board with a battery.

15 Claims, 9 Drawing Sheets

Related U.S. Application Data continuation of application No. PCT/JP2018/022497, filed on Jun. 13, 2018.

(58) Field of Classification Search
USPC .......................................................... 345/179
See application file for complete search history.

(56) References Cited

U.S. PATENT DOCUMENTS

| | | | |
|---|---|---|---|
| 2015/0239225 A1* | 8/2015 | Helmer | B29C 65/16 156/272.8 |
| 2016/0188008 A1 | 6/2016 | Horie et al. | |
| 2018/0101251 A1 | 4/2018 | Fujitsuka et al. | |

* cited by examiner

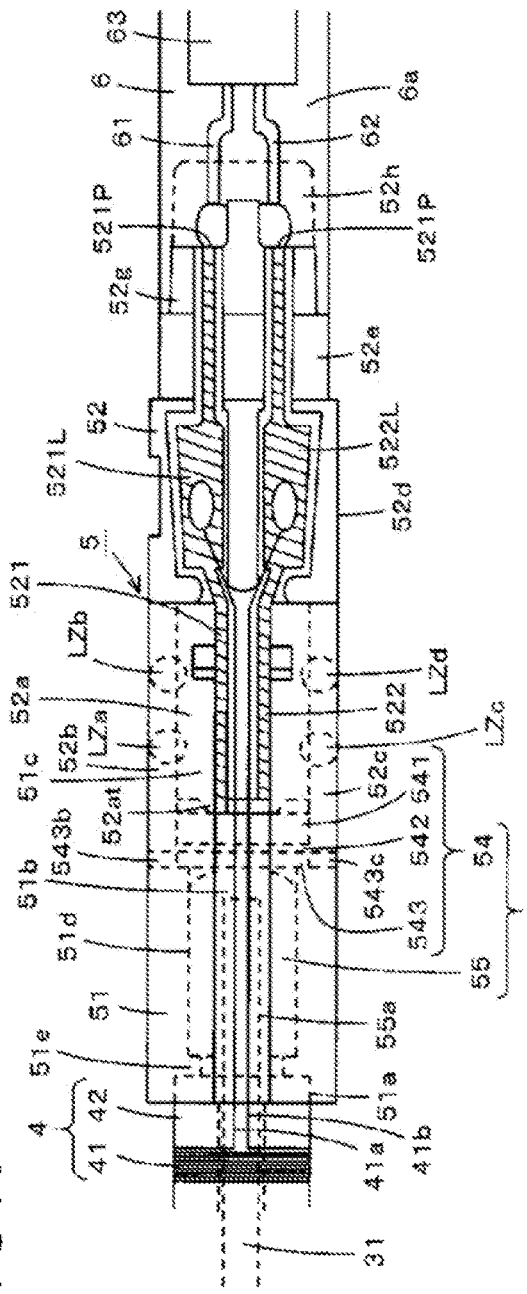

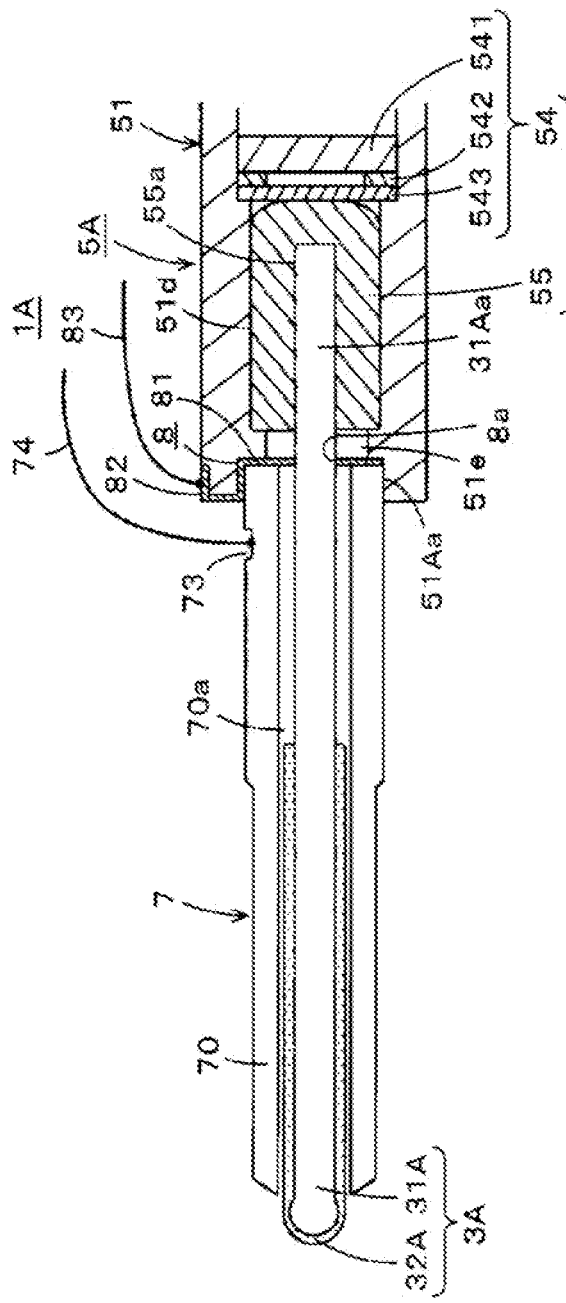
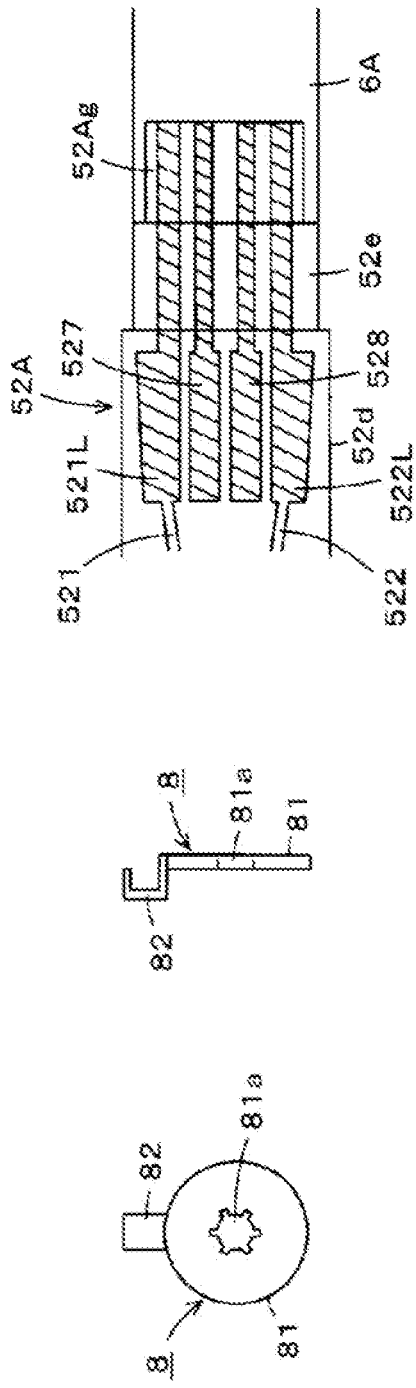

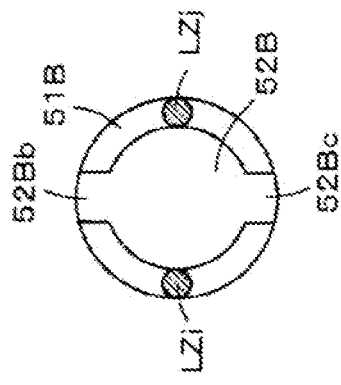
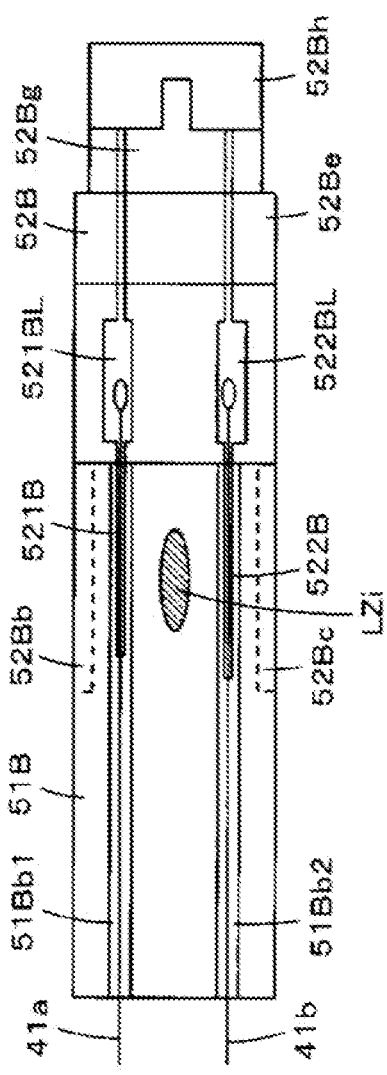
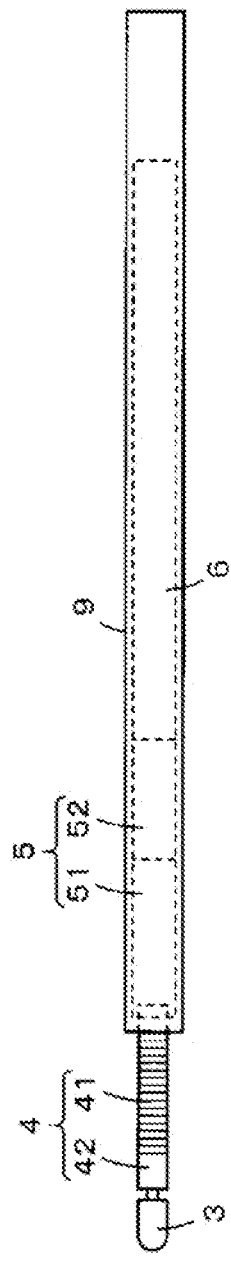

ELECTRONIC PEN AND CARTRIDGE FOR ELECTRONIC PEN

BACKGROUND

Technical Field

The present disclosure relates to an electronic pen and a cartridge for an electronic pen.

Background Art

In recent years, electronic pens have been thinned. Thus, for example, as disclosed in WO2017/010336 (hereinafter, referred to as Patent Document 1), parts of an electronic pen are arranged to be coupled to each other in a long-thin tubular casing in the axial direction in recent years.

In an electromagnetic induction electronic pen disclosed in Patent Document 1, in a tubular casing, a ferrite core around which a coil is wound, a long-thin printed circuit board having circuit parts mounted thereon, and a pen pressure detecting module are arranged in the axial direction. In this case, the pen pressure detecting module is placed between the ferrite core around which the coil is wound and the printed circuit board. The ferrite core around which the coil is wound is coupled to the core side of the pen pressure detecting module, and the printed circuit board is held on the side opposite to the core side of the pen pressure detecting module.

Moreover, in Patent Document 1, the pen pressure detecting module is divided into two parts in the axial direction: an engaging member inside which the ferrite core is coupled and a holder configured to hold the printed circuit board, and holds a pen pressure detector with the engaging member and the holder coupled to each other. In this case, in Patent Document 1, the engaging member and the holder are made of resin, and one of the components has a fitting protrusion and the other has a fitting recessed groove such that the engaging member and the holder can be fitted and coupled to each other while an inner space for housing the pen pressure detector is secured therebetween. Moreover, when the fitting protrusion and the fitting recessed groove are fitted to each other while the space for housing the pen pressure detector is secured, the engaging member and the holder are fitted to each other, to thereby be fitted and coupled to each other with the use of the elasticity of the resin.

Incidentally, in Patent Document 1, the engaging member and the holder of the pen pressure detecting module are required to be coupled to each other so as to firmly hold the pen pressure detector without a wobble. This is because, if the pen pressure detector is wobbly, there is a risk that the pen pressure detector cannot detect pen pressure accurately.

Thus, the fitting protrusion and the fitting recessed groove, which are formed to the engaging member and the holder, are required to be formed into shapes and dimensions that enable accurate fitting with high precision. However, it is difficult to form the engaging member and the holder so as to have shapes and dimensions that satisfy the conditions. In particular, since the pen pressure detecting module requires a strength enough to keep the conditions after coupling since the pen pressure detecting module receives pen pressure, there is a risk that even when the conditions are initially satisfied, the pen pressure detector may become wobbly later.

Accordingly, it is conceivable to firmly couple the engaging member and the holder to each other with the use of an adhesive in addition to fitting and coupling the components. However, in such a case, adhesive application is required before a first coupling member and a second coupling member are fitted and coupled to each other, which requires an effort. Further, the first coupling member and the second coupling member are required to be fitted and coupled to each other while attention is paid such that the adhesive does not adhere to parts not requiring adhesion, which is burdensome.

Moreover, in a case where a slow-acting adhesive that takes a long time for adhesive curing is used, the coupling state is required to be maintained until the adhesive is cured, which is a problem. Further, in a case where a fast-acting adhesive is used, if the adhesive adheres to parts not requiring adhesion when the engaging member and the holder are fitted to each other, fitting is difficult, with the result that fitting is burdensome, which is a problem. Further, in a case where an adhesive is used, the adhesive leaks out later to inversely affect movement of the pen pressure detector in the axial direction, which is a problem.

BRIEF SUMMARY

The present disclosure has an object to provide an electronic pen capable of solving the problems described above.

In order to solve the above-mentioned problems, according to the present disclosure, there is provided an electronic pen including: a tubular casing; and a first coupling member and a second coupling member that are coupled to each other in a hollow portion of the casing in an axial direction of the casing, in which in the axial direction, the first coupling member and the second coupling member are coupled to each other while partially overlapping each other, and in a coupling portion between the first coupling member and the second coupling member, a welded portion that attaches the first coupling member and the second coupling member to each other is formed.

In the electronic pen of the disclosure having the above-mentioned configuration, the first coupling member and the second coupling member are arranged to be coupled to each other in the hollow portion of the tubular casing in the axial direction. Moreover, the first coupling member and the second coupling member are coupled to each other while partially overlapping each other, and in the coupling portion, which is the overlapping portion, the welded portion that attaches the components to each other is formed.

In this case, the welded portion can be formed through, for example, laser light radiation in a state where the first coupling member and the second coupling member are fitted and coupled to each other and an appropriate coupling state is made through adjustment. The components can thus be firmly attached to each other while being precisely joined together. This prevents a wobble that occurs later in a case where the first coupling member and the second coupling member are only fitted and coupled to each other.

Further, since no adhesive is used, adhesive application before the first coupling member and the second coupling member are fitted and coupled to each other is not required, with the result that fitting and coupling is easy and there is no fear that an adhesive leaks out later. In addition, since the process after fitting and coupling is only generating a welded portion, the working process is simple, which is suitable for mass production.

BRIEF DESCRIPTION OF THE DRAWINGS

FIG. 3A and FIG. 3B are views each illustrating a part of the electronic pen according to the first embodiment of the present disclosure;

FIG. 7A to FIG. 7D are views each illustrating a part of an electronic pen according to a second embodiment of the present disclosure;

FIG. 10A to FIG. 10C are views illustrating electronic pens according to another embodiment and a modified example of the present disclosure.

DETAILED DESCRIPTION

First Embodiment

An electronic pen according to a first embodiment of the present disclosure is described with reference to the drawings by taking, as an example, a case where the electronic pen is an electromagnetic induction electronic pen configured to transmit indicated positions to a position detecting device through electromagnetic induction.

Figure 1:
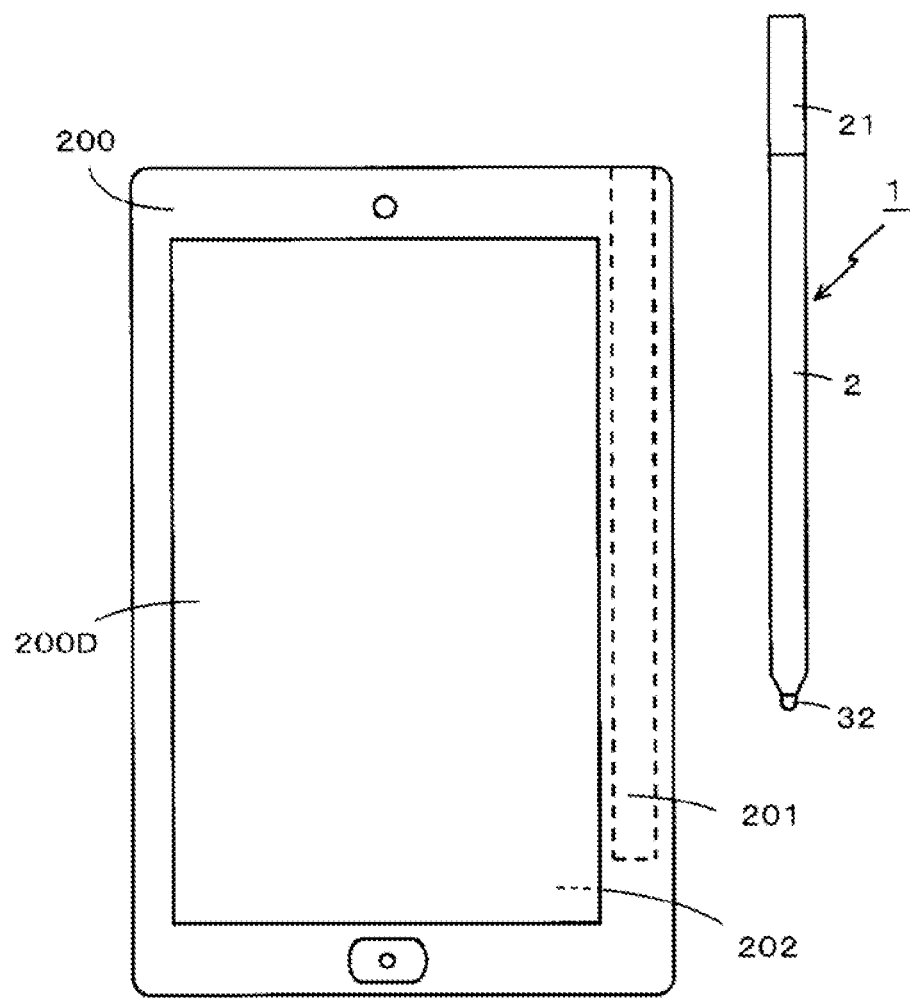
FIG. 1 is a view illustrating an example of an electronic device with which an electronic pen according to a first embodiment of the present disclosure is used.

FIG. 1 is a view illustrating an example of an electronic device 200 that uses an electronic pen 1 of the first embodiment. In this example, the electronic device 200 is a high-function cellular phone terminal including a display screen 200D of a display device, for example, a liquid crystal display (LCD), and includes an electromagnetic induction position detecting device 202 in the lower portion (rear side) of the display screen 200D.

A casing of the electronic device 200 in this example has a housing recessed hole 201 for housing the electronic pen 1. A user takes out the electronic pen 1 housed in the housing recessed hole 201 from the electronic device 200 as needed, and performs position indicating operation on the display screen 200D as an input surface.

In the electronic device 200, when position indicating operation is performed on the display screen 200D with the electronic pen 1, the position detecting device 202, which is provided on the rear side of the display screen 200D, detects a position on which operation is made with the electronic pen 1, and pen pressure, and a microcomputer of the position detecting device 202 of the electronic device 200 performs display processing depending on the operated position and pen pressure on the display screen 200D.

In the electronic pen 1 of this embodiment, in a hollow portion of a tubular casing 2 made of resin, for example, a plurality of parts of the electronic pen 1 are arranged and housed in the axial direction. Moreover, the tubular casing 2 is tapered toward one end and has an opening (not illustrated in FIG. 1) formed in the end portion of the tubular casing 2. A distal end portion 32 of a bar-like core 3, which is described later, is exposed through the opening as a pen point. Moreover, the side opposite to the pen point side of the casing 2 is closed with a casing cap 21 fitted to the casing 2.

Figure 2:
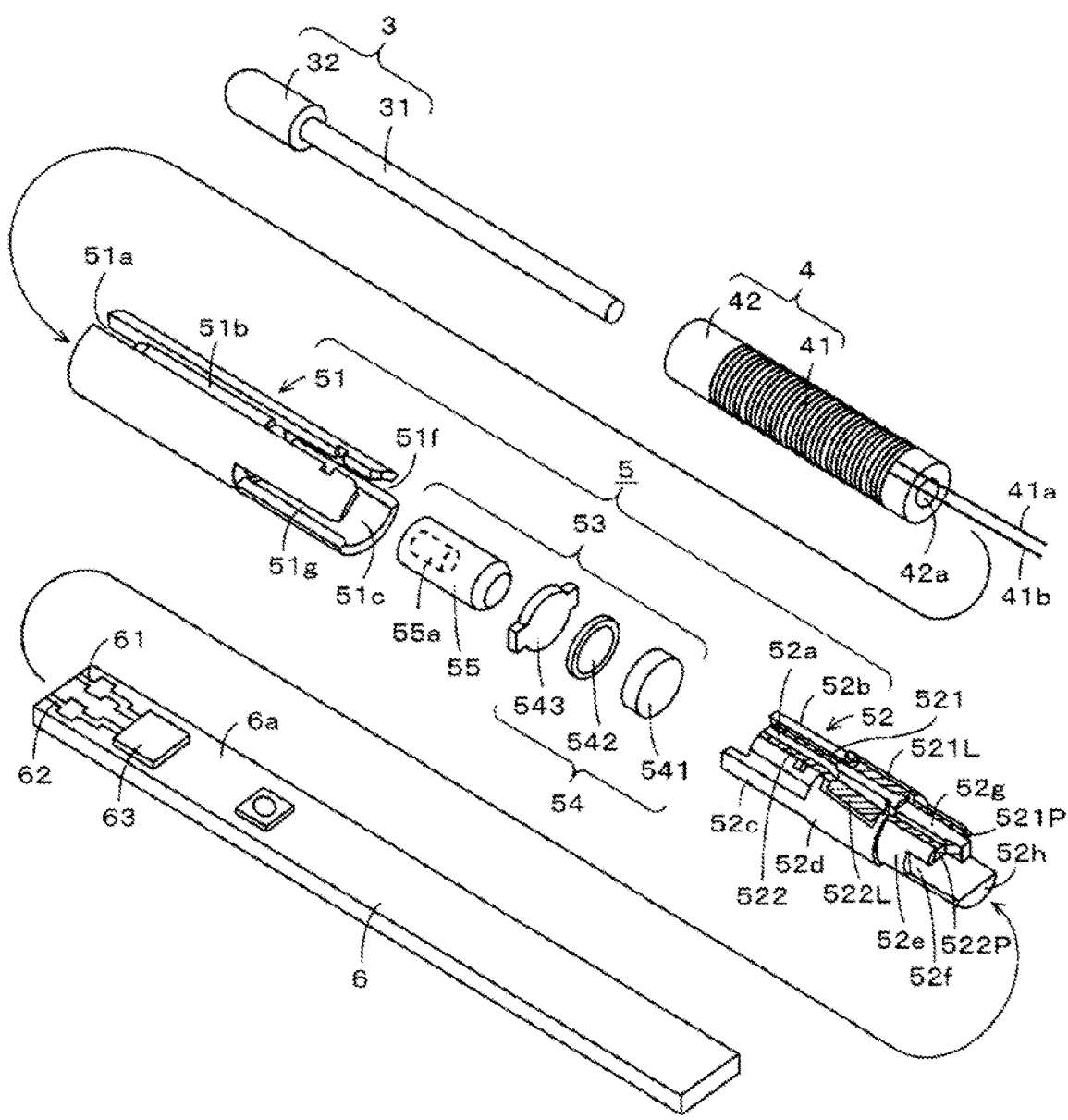
FIG. 2 is an exploded perspective view illustrating an internal configuration example of the electronic pen according to the first embodiment of the present disclosure.

FIG. 2 is an exploded perspective view in which parts of a part group that is housed in the casing 2 of the electronic pen 1 are arranged. As illustrated in FIG. 2, in the hollow portion of the casing 2, in order from the pen point side, the core 3, a coil member 4 through which the core 3 is inserted, a pen pressure detecting module 5, and a printed circuit board 6 are arranged in the axial direction of the casing 2. The printed circuit board 6 is an example of a circuit board.

The core 3 includes a core main body portion 31 and the distal end portion 32 serving as the pen point. The core 3 is mounted with all the above-mentioned parts housed in the hollow portion of the casing 2 and the core main body portion 31 inserted from a pen point-side opening of the casing 2 to be engaged with a pusher member 55 that is provided to the pen pressure detecting module 5 as described later. The core 3 is made of a hard non-conductive material, for example, resin such as polycarbonate, a synthetic resin, or an acrylonitrile-butadiene-styrene (ABS) resin such that the core 3 can transmit pressure (pen pressure) that is applied to the distal end portion 32 to a pen pressure detector 53 of the pen pressure detecting module 5. The core 3 is insertable into the electronic pen 1.

The coil member 4 is a core-side component and includes a coil 41 and a magnetic core around which the coil 41 is wound, which is a ferrite core 42 in this example. The ferrite core 42 of the coil member 4 in this example has a columnar shape having, at the central axis position, a through hole 42a having a diameter slightly larger than the diameter of the core main body portion 31 in order that the core main body portion 31 of the bar-like core 3 may be inserted through the ferrite core 42. Note that the distal end portion 32 of the core 3 in this example has a diameter slightly larger than the diameter of the core main body portion 31.

The pen pressure detecting module 5 in this embodiment is divided into two parts in the axial direction and includes a pen pressure detector holder 51 that is an example of a first coupling member and a circuit connecting member 52 that is an example of a second coupling member, as illustrated in the exploded perspective view of FIG. 2. Moreover, as described later, with the pen pressure detector holder 51 and the circuit connecting member 52 fitted and coupled to each other in the axial direction, in this example, the pen pressure detector 53 including a plurality of parts can be housed in the pen pressure detecting module 5. Note that, in the following description, for the sake of simplicity, the pen pressure detector holder 51 is abbreviated as "holder 51."

FIG. 3A and FIG. 3B are views illustrating a state in which the holder 51 and the circuit connecting member 52 are fitted and coupled to each other in the axial direction. The holder 51 and the circuit connecting member 52 in this example are formed as, for example, injection molded products using an insulating resin that can be welded through laser light radiation (laser welding). Moreover, as illustrated in FIG. 3A and FIG. 3B, the holder 51 and the circuit connecting member 52 are firmly attached to each other through laser light radiation that makes laser welding at several points in a portion in which the components fitted and coupled to each other partially overlap each other, as indicated by dotted circles in FIG. 3A and FIG. 3B.

In this example, in the coupling portion between the holder 51 and the circuit connecting member 52, the circuit connecting member 52 is partially inserted and fitted to the holder 51. In the coupling portion, the holder 51 accommodates the circuit connecting member 52. Thus, the holder 51 is made of a light-transmitting resin through which laser light passes, and the circuit connecting member 52 is made of a light-absorbing resin that absorbs laser light. In this example, the holder 51 is made of a transparent or translucent resin, and the circuit connecting member 52 is made of a dark-colored resin.

Note that the holder 51 is not necessarily made of a light-transmitting resin entirely, and it is only necessary that at least the coupling portion to the circuit connecting member 52 be made of a light-transmitting resin. In a similar manner, the circuit connecting member 52 is not necessarily made of a light-absorbing resin entirely, and it is only necessary that at least the coupling portion to the holder 51 be made of a light-absorbing resin.

Moreover, as illustrated in FIG. 2, FIG. 3A and FIG. 3B, the holder 51 has a substantially cylindrical shape having a through-hole portion in the axial direction. Further, the circuit connecting member 52 is formed into a shape with which, when the circuit connecting member 52 and the holder 51 are fitted and coupled to each other to form the pen pressure detecting module 5, a whole structure has a substantially cylindrical outer shape as illustrated in FIG. 3A and FIG. 3B. In this case, the outer diameter of the holder 51 and the maximum diameter of the circuit connecting member 52 are equal to each other.

As illustrated in FIG. 2, in the axial direction of the casing 2, the holder 51 of the pen pressure detecting module 5 is provided on the coil member 4 side, while the circuit connecting member 52 is provided on the printed circuit board 6 side. Moreover, as illustrated in FIG. 2, FIG. 3A, and FIG. 3B, a fitting recessed portion 51a to which the ferrite core 42 is fitted is formed on the coil member 4 side in the axial direction of the holder 51. To the fitting recessed portion 51a, the side opposite to the inserting side of the core 3 of the ferrite core 42 is fitted, with the result that the coil member 4 is coupled to the holder 51. Moreover, the holder 51 has a recessed groove 51b formed along the axial direction such that one end portion 41a and another end portion 41b of the coil 41 of the coupled coil member 4 can be extended to the circuit connecting member 52 without protruding from the side-peripheral surface of the holder 51.

Note that FIG. 3A and FIG. 3B are views in which the pen pressure detecting module 5 is seen from a direction orthogonal to the axial direction. FIG. 3A is a view in which the pen pressure detecting module 5 is seen from a direction in which the recessed groove 51b is seen at the center of the holder 51. FIG. 3B is a view in which the pen pressure detecting module 5 is seen in a state where the state in FIG. 3A is rotated by 180° such that the recessed groove 51b is positioned on the rear side.

The pen pressure detector 53 includes a pressure sensor 54 and the pusher member 55 as illustrated in FIG. 2. The pusher member 55 is a pressure transmitting member for transmitting pen pressure (pressure) that is applied to the distal end portion 32 of the core 3 to the pressure sensor 54.

The pressure sensor 54 in this embodiment includes a dielectric 541, a spacer 542, and a conductive elastic body 543 as illustrated in FIG. 2, and FIG. 4A to FIG. 4C.

Figure 4A:
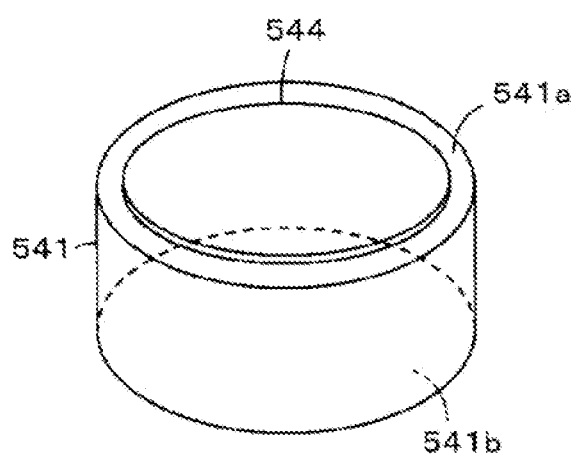
FIG. 4A to FIG. 4C are views each illustrating a pen pressure detector that is used in the electronic pen according to the first embodiment of the present disclosure.

The dielectric 541 has a substantially disc shape, for example, as illustrated in FIG. 4A. The dielectric 541 has one round surface 541a and another round surface 541b opposite to each other, and a round conductor layer 544 is formed on the one surface 541a of the dielectric 541. The conductor layer 544 is a first electrode of a variable capacitor including the pressure sensor 54 in this example.

Figure 4B:
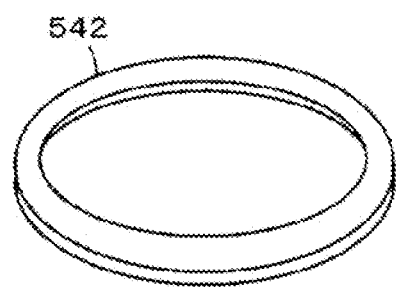

The spacer 542 is made of an insulating material, and is a ring-like thin plate-like body having an outer diameter that is the same as the diameter of the dielectric 541 as illustrated in FIG. 4B.

Figure 4C:
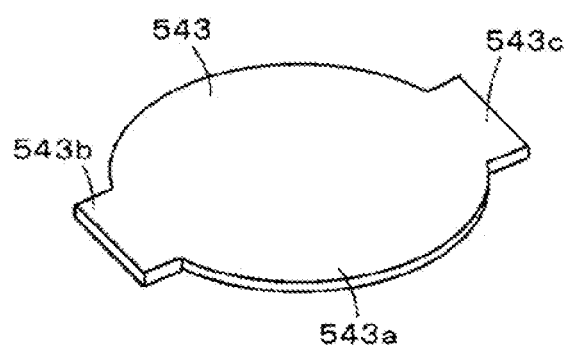

The conductive elastic body 543 in this example is made of conductive elastic rubber. The conductive elastic body 543 in this example has, as illustrated in FIG. 4C, a shape in which two protruded portions 543b and 543c are formed from portions of the periphery of a disc-like thin plate-like body 543a that are separated from each other by the angle of 180°, the disc-like thin plate-like body 543a having an outer diameter that is the same as the diameter of the dielectric 541. The spacer 542 is, for example, bonded on the disc-like plate-like body 543a of the conductive elastic body 543 in a state where the outer periphery of the spacer 542 matches the outer periphery of the conductive elastic body 543. In the state where the spacer 542 is bonded to the conductive elastic body 543, the two protruded portions 543b and 543c of the conductive elastic body 543 protrude outward from the outer periphery of the spacer 542.

The pusher member 55 is made of, for example, resin and has a shell shape that bulges out on the conductive elastic body 543 side like a dome as illustrated in FIG. 2, FIG. 3A and FIG. 3B. The pusher member 55 in this example has an outer diameter smaller than the diameter of the dielectric 541. Moreover, a recessed hole 55a is formed on the side opposite to the conductive elastic body 543 side of the pusher member 55. To the recessed hole 55a, an end portion on the side opposite to the distal end portion 32 of the core main body portion 31 of the core 3 is fitted and inserted.

Moreover, on the surface 541b side, which is the side opposite to the surface 541a on which the conductor layer 544 is formed of the dielectric 541, the conductive elastic body 543 is placed in an overlapping manner through the spacer 542 such that the conductive elastic body 543 is pushed by the pusher member 55 through the spacer 542 from the side opposite to the dielectric 541 side. The variable capacitor is formed in this way.

Specifically, the variable capacitor in this example includes the first electrode including the conductor layer 544 formed on the one surface 541a of the dielectric 541, and a second electrode including the conductive elastic body 543. In a state where the conductive elastic body 543 is not pushed by the pusher member 55 (a state where pen pressure is not applied), the surface 541b of the dielectric 541 and the conductive elastic body 543 have a space corresponding to the thickness of the spacer 542 therebetween. Moreover, when the conductive elastic body 543 is pushed by the pusher member 55, the conductive elastic body 543 is brought into contact with the dielectric 541 in an area depending on the magnitude of the pressing force. This means that the capacitance between the first electrode and the second electrode of the variable capacitor including the pressure sensor 54 in this example changes depending on a contact area between the conductive elastic body 543 and the dielectric 541 based on pressure (pen pressure) that is applied to the pusher member 55.

In the holder 51 of the pen pressure detecting module 5, as illustrated in FIG. 2, FIG. 3A, and FIG. 3B, a cylindrical recessed portion 51c is formed from the substantially central position in the axial direction to an axial end portion position on the circuit connecting member 52 side of the holder 51. In the recessed portion 51c, as illustrated in FIG. 2, FIG. 3A, and FIG. 3B, the pressure sensor 54 of the pen pressure detector 53 is housed. A fitting portion 52a, which is described later, of the circuit connecting member 52 is fitted to the recessed portion 51c as described later. With this, the pressure sensor 54 is sandwiched by the holder 51 and the circuit connecting member 52 in the axial direction.

Moreover, in the portion on the side of the coupling portion to the coil member 4 of the substantially axial central position of the holder 51, a recessed portion 51d for housing the pusher member 55 is formed so as to partially communicate with the above-mentioned recessed portion 51c. In order to allow the end portion of the core main body portion 31 of the core 3 to be inserted and fitted to the recessed hole 55a formed in the pusher member 55 that is housed in the recessed portion 51d, the recessed portion 51d spatially communicates with the fitting recessed portion 51a to which the coil member 4 is fitted as indicated by a dotted line in FIG. 3A and FIG. 3B.

However, between the end portion (bottom portion) on the coil member 4 side of the recessed portion 51d for housing the pusher member 55 and the bottom portion of the fitting recessed portion 51a to which the coil member 4 is fitted, a step portion 51e for preventing the pusher member 55 from dropping on the coil member 4 side is formed.

Further, a step portion is formed by the recessed portion 51c and the recessed portion 51d. Further, the depth of the recessed portion 51d to the step portion 51e in this example is equal to the axial length of the pusher member 55. This means that when the pusher member 55 is housed in the recessed portion 51d, the distal end of the bulging-out surface of the shell and the step portion, which is formed by the recessed portion 51c and the recessed portion 51d, are positioned on the same plane, and the pusher member 55 does not protrude toward the recessed portion 51c in this state.

Moreover, in the side-peripheral surface of the recessed portion 51c of the holder 51, at positions separated from each other by the angle of 180°, slit portions 51f and 51g are formed along the axial direction. The slit portions 51f and 51g have a width slightly larger than the circumferential width of the protruded portions 543b and 543c of the conductive elastic body 543 of the pressure sensor 54 such that the protruded portions 543b and 543c of the conductive elastic body 543 are insertable into the slit portions 51f and 51g.

This means that, as illustrated in FIG. 3A and FIG. 3B, the conductive elastic body 543 of the pressure sensor 54 can be housed to the step portion, which is formed by the recessed portion 51c and the recessed portion 51d, in the recessed portion 51c in a state where the two protruded portions 543b and 543c are inserted into the slit portions 51f and 51g.

Next, the configuration of the circuit connecting member 52 that is fitted and coupled to the holder 51 is described. In this embodiment, the circuit connecting member 52 of the pen pressure detecting module 5 includes, on the holder 51 side in the axial direction, the cylindrical fitting portion 52a that is fitted to the recessed portion 51c of the holder 51, and protrusions 52b and 52c that are fitted to the slit portions 51f and 51g of the holder 51, as illustrated in FIG. 2, FIG. 3A, and FIG. 3B.

Specifically, as illustrated in FIG. 2, FIG. 3A, FIG. 3B, FIG. 5A, and FIG. 5B, the fitting portion 52a of the circuit connecting member 52 has a small-diameter cylindrical shape that is fitted to the recessed portion 51c of the holder 51. The protrusions 52b and 52c are formed along the axial direction at positions opposite to each other with the angle of 180° on the side-peripheral surface of the fitting portion 52a so as to radially protrude such that the protrusions 52b and 52c are fitted to the slit portions 51f and 51g of the holder 51.

The substantially axial central portion of the circuit connecting member 52 serves as a large-diameter portion 52d having a diameter equal to the outer diameter of the holder 51. The fitting portion 52a and the protrusions 52b and 52c are formed to protrude from the large-diameter portion 52d toward the holder 51. The protruding end surfaces of the protrusions 52b and 52c are flush with the large-diameter portion 52d.

On the side opposite to the holder 51 of the large-diameter portion 52d, a holding connection portion 52e for holding the printed circuit board 6 is formed. On the holding connection portion 52e, two plate-like protruded portions 52g and 52h protruding in the axial direction to sandwich the axial end portion on the core 3 side of the printed circuit board 6 are provided. The two axial protruded portions 52g and 52h have opposite planar surfaces separated from each other by the thickness of the printed circuit board 6, and a recessed groove 52f is formed as a space between the plane surfaces opposite to each other.

Moreover, on the circuit connecting member 52, as conductive three-dimensional fine patterns, two line members 521 and 522 for electrical connection (indicated by diagonal lines in FIG. 2, FIG. 3A, and FIG. 3B for the sake of easy understanding) are formed in the axial direction from one end to the other end in the axial direction. Specifically, the line members 521 and 522 are formed across the fitting portion 52a, the large-diameter portion 52d, and the holding connection portion 52e.

In this case, the two line members 521 and 522 are formed in the circuit connecting member 52 at angular positions that correspond to an extension direction of the recessed groove 51b of the holder 51 when the protrusions 52b and 52c of the circuit connecting member 52 are fitted to the slit portions 51f and 51g of the holder 51 as illustrated in FIG. 3A. Specifically, the two line members 521 and 522 are formed in the circumferential direction of the circuit connecting member 52 at angular positions right between the angular positions at which the two protrusions 52b and 52c are formed. This means that, in the holding connection portion 52e, the two line members 521 and 522 are only formed on the upper surface of the axial protruded portion 52g as illustrated in FIG. 2 and FIG. 3A.

In this case, as illustrated in FIG. 2, FIG. 3A and FIG. 3B, and FIG. 5A and FIG. 5B, the two line members 521 and 522 are formed separately along the axial direction of the circuit connecting member 52 at the positions close to each other in the circumferential direction. Specifically, in this embodiment, the two line members 521 and 522 are collectively formed along the axial direction at substantially the same angular position in the circumferential direction of the circuit connecting member 52. Moreover, the two line members 521 and 522 are formed to be exposed on the axial end surface facing the holder 51 of the fitting portion 52a and the axial end surface facing the printed circuit board 6 of the protruded portion 52g of the holding connection portion 52e.

In this embodiment, the line members 521 and 522 are integrally formed on the surface of the circuit connecting member 52 as three-dimensional fine patterns. As a method of forming the two line members 521 and 522 on the surface of the circuit connecting member 52 as three-dimensional fine patterns, for example, Microscopic Integrated Processing Technology (MIPTEC) that has been developed by Panasonic Corporation and is an applied technology for molded interconnect devices (MIDs) can be used. On the surfaces of the line members 521 and 522, which have been formed as three-dimensional fine patterns, a nickel plating layer is formed and a gold plating layer is further formed thereon in order to facilitate electrical connection by contacting and soldering.

Figure 5A:
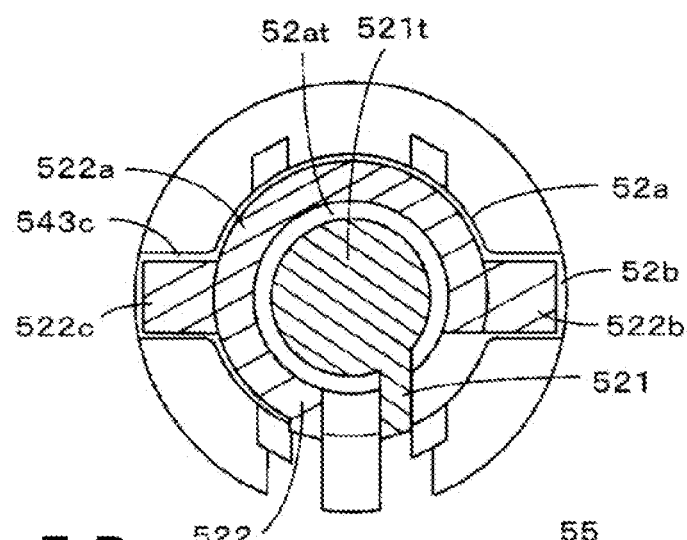
FIG. 5A and FIG. 5B are views each illustrating details of part of the electronic pen according to the first embodiment of the present disclosure.
Figure 5B:
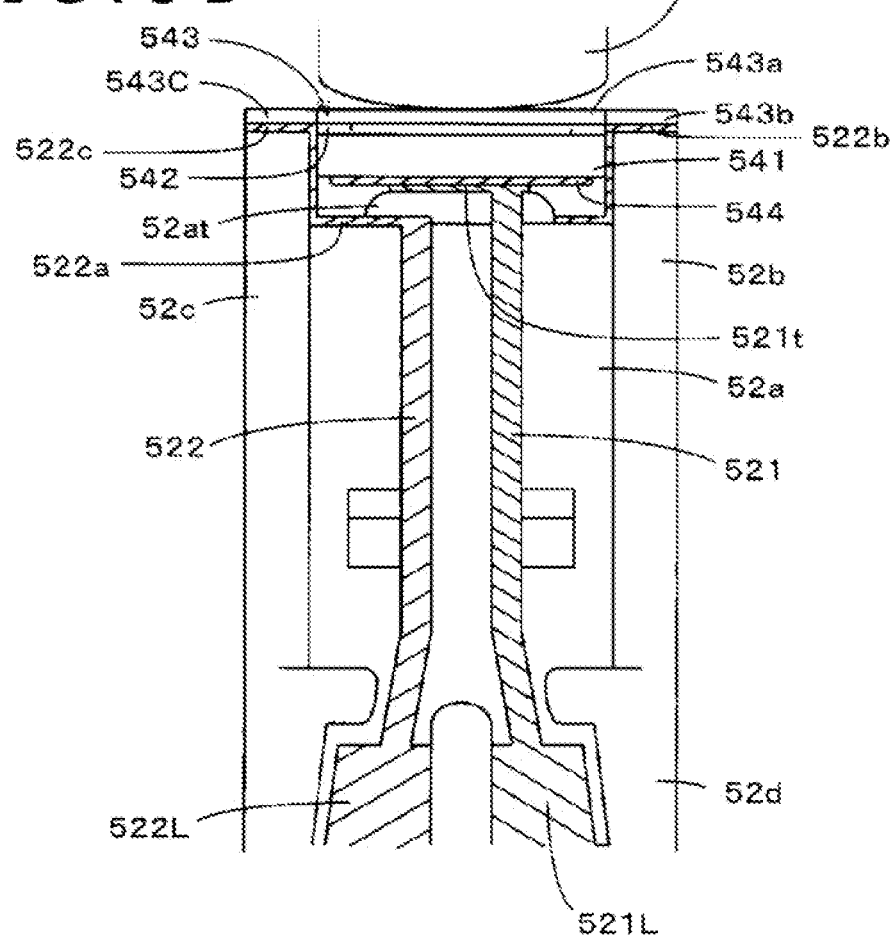

FIG. 5A is a view illustrating the circuit connecting member 52 seen from the holder 51 side in the axial direction, and in particular, is a view illustrating a region around the line members 521 and 522 on the end surface facing the holder 51 of the cylindrical fitting portion 52a. Further, FIG. 5B is a view illustrating the circuit connecting member 52 seen from the direction orthogonal to the axial direction, and in particular, is a view partly illustrating the cylindrical fitting portion 52a and the large-diameter portion 52d. Note that, in FIG. 5A and FIG. 5B, the two line members 521 and 522 of the circuit connecting member 52 are indicated by diagonal lines for the sake of easy understanding.

Further, in FIG. 5B, in order to illustrate an electrical connection relation between the two line members 521 and 522 of the circuit connecting member 52 and the pen pressure detector 53, the pen pressure detector 53 is also illustrated. Note that the pen pressure detector 53 is practically housed in the recessed portion 51c of the holder 51, and with the circuit connecting member 52 fitted to the holder 51, electrical connection between the pen pressure detector 53 and the line members 521 and 522 of the circuit connecting member 52 is made.

As illustrated in FIG. 3A and FIG. 3B, and FIG. 5A and FIG. 5B, on the end surface on the holder 51 side of the fitting portion 52a of the circuit connecting member 52, a circular protrusion 52at that protrudes toward the holder 51 and has a diameter smaller than the diameter of the fitting portion 52a is formed. The circular protrusion 52at has an upper end surface being a plane surface. One of the line members 521 and 522, which is the line member 521 in this example, is formed to the upper end surface of the circular protrusion 52at as illustrated in FIG. 5A and FIG. 5B. In this example, as illustrated in FIG. 5A, the line member 521 serves as a circular pattern 521t on the upper end surface of the circular protrusion 52at.

The circular pattern 521t on the upper end surface of the circular protrusion 52at of the line member 521 is brought into contact with and electrically connected to the conductor layer 544 formed on one surface of the dielectric 541 when the circuit connecting member 52 is fitted to the holder 51 as illustrated in FIG. 5B. That is, in this example, the line member 521 is electrically connected to the first electrode of the variable capacitor including the pressure sensor 54.

The protrusions 52b and 52c, which are formed on the side surface of the fitting portion 52a of the circuit connecting member 52, are formed to protrude on the holder 51 side of the upper end surface of the circular protrusion 52at of the fitting portion 52a as illustrated in FIG. 3A, FIG. 3B, and FIG. 5B. The protrusions 52b and 52c protrude on the holder 51 side of the upper end surface of the circular protrusion 52at of the fitting portion 52a by a length equal to the total of the thickness of the dielectric 541 and the thickness of the spacer 542 as illustrated in FIG. 5B.

Moreover, as illustrated in FIG. 5A, a ring-like pattern 522a connected to the line member 522 is formed around the circular protrusion 52at in the fitting portion 52a. The ring-like pattern 522a and the circular pattern 521t of the line member 521 on the upper end surface of the circular protrusion 52at are separated from each other in the axial direction and in the radial direction of the circuit connecting member 52 that is orthogonal to the axial direction. With this, the circular pattern 521t of the line member 521 and the ring-like pattern 522a of the line member 522 are electrically separated from each other sufficiently.

Moreover, as illustrated in FIG. 5A and FIG. 5B, extended end surface patterns 522b and 522c are formed from the ring-like pattern 522a of the line member 522 to the inner wall surfaces and the end surfaces on the holder 51 side of the protrusions 52b and 52c. As described above, the protrusions 52b and 52c protrude on the holder 51 side of the upper end surface of the circular protrusion 52at of the fitting portion 52a by the length equal to the total of the thickness of the dielectric 541 and the thickness of the spacer 542 as illustrated in FIG. 5B. This means that, as illustrated in FIG. 5B, when the circuit connecting member 52 is fitted to the holder 51, the extended end surface patterns 522b and 522c, which are formed on the distal end surfaces of the protrusions 52b and 52c, are brought into abutment against the protruded portions 543b and 543c of the conductive elastic body 543 of the pressure sensor 54 to be electrically connected thereto.

The line members 521 and 522 in the large-diameter portion 52d of the circuit connecting member 52 serve as wide land patterns 521L and 522L as illustrated in FIG. 2, FIG. 3A, and FIG. 5B. To the land patterns 521L and 522L, the one end portion 41a and the other end portion 41b of the coil 41 are soldered, for example, as illustrated in FIG. 3A.

Further, the line members 521 and 522 in the plate-like protruded portion 52g of the holding connection portion 52e are extended also to the axial end surface of the protruded portion 52g as connection patterns 521P and 522P with the printed circuit board 6 as illustrated in FIG. 2 and FIG. 3A.

Conductive patterns 61 and 62 are provided on a circuit component arrangement surface 6a side in the longitudinal end portion on the circuit connecting member 52 side of the printed circuit board 6 as illustrated in FIG. 2 and FIG. 3A. The conductive patterns 61 and 62 are formed to be brought into contact with and electrically connected to the connection patterns 521P and 522P formed on the end surface of the protruded portion 52g of the holding connection portion 52e of the circuit connecting member 52 when the end portion of the printed circuit board 6 is inserted into the recessed groove 52f of the holding connection portion 52e of the circuit connecting member 52.

On the printed circuit board 6, a capacitor 63 that forms a resonance circuit together with the coil 41 is provided. The conductive patterns 61 and 62 are arranged to be respectively connected to one electrode and the other electrode of the capacitor 63. Note that, although not illustrated in FIG. 2, necessary electronic parts other than the capacitor 63 are arranged on the printed circuit board 6.

[Assembly Procedure of Pen Pressure Detecting Module 5]

The holder 51 and the circuit connecting member 52, which are configured as described above, are fitted and coupled to each other in a state where the pen pressure detector 53 is housed in the recessed portion 51c and the recessed portion 51d of the holder 51. The pen pressure detecting module 5 can be assembled in this way.

First, the pusher member 55 is inserted into the holder 51 from the side of the coupling portion to the circuit connecting member 52, to thereby be housed in the recessed portion 51d through the recessed portion 51c. At this time, the pusher member 55 is engaged with the step portion 51e of the recessed portion 51d so as not to drop from the holder 51 on the side of the coupling portion to the coil member 4.

Next, the conductive elastic body 543 to which the spacer 542 has been bonded is inserted into the recessed portion 51c from the side of the coupling portion to the circuit connecting member 52 to be housed therein in a state where the side opposite to the surface of the conductive elastic body 543 on which the spacer 542 has been bonded faces the pusher member 55 and the protruded portions 543b and 543c of the conductive elastic body 543 are inserted into the slit portions 51f and 51g of the holder 51. The conductive elastic body 543 is housed in the bottom portion of the recessed portion 51c in a state where the disc-like plate-like body 543a is in contact with the distal end surface of the pusher member 55 as illustrated in FIG. 3A and FIG. 3B.

Next, the dielectric 541 is housed in the recessed portion 51c of the holder 51 in a state where the side opposite to the surface of the dielectric 541 on which the conductor layer 544 has been formed faces the conductive elastic body 543.

Next, the circuit connecting member 52 is fitted to the holder 51. Specifically, the fitting portion 52a of the circuit connecting member 52 is fitted to the recessed portion 51c of the holder 51 in a state where the protrusions 52b and 52c of the circuit connecting member 52 are fitted to the slit portions 51f and 51g of the holder 51. In this state, as illustrated in FIG. 3A, the line members 521 and 522 of the circuit connecting member 52 are positioned in the region of the recessed groove 51b of the holder 51 or the vicinity thereof.

In this way, in the state where the holder 51 and the circuit connecting member 52 are fitted and engaged with each other, the circular pattern 521t of the line member 521 formed on the upper end of the circular protrusion 52at of the fitting portion 52a of the circuit connecting member 52 is in contact with the conductor layer 544 formed on the dielectric 541 of the pressure sensor 54, with the result that the conductor layer 544 and the line member 521 are electrically connected to each other. That is, the first electrode of the variable capacitor including the pen pressure detector 53 is electrically connected to the line member 521 of the circuit connecting member 52.

Further, the extended end surface patterns 522b and 522c, which are formed on the line member 522 on the distal end surfaces of the protrusions 52b and 52c protruding from the fitting portion 52a of the circuit connecting member 52 in the direction orthogonal to the axial direction, are in contact with the protruded portions 543b and 543c of the conductive elastic body 543, with the result that the conductive elastic body 543 and the line member 522 are electrically connected to each other. That is, the second electrode of the variable capacitor including the pen pressure detector 53 is electrically connected to the line member 522 of the circuit connecting member 52.

As described above, in the first embodiment, the circular pattern 521t, which is formed on the line member 521 electrically connected to the conductor layer 544 formed on the dielectric 541 of the first electrode of the variable capacitor, and the ring-like pattern, which is formed on the line member 522 electrically connected to the conductive elastic body 543 of the second electrode of the variable capacitor, are electrically separated from each other sufficiently. In a case where conductor patterns connected to a first electrode and a second electrode of a variable capacitor are close to each other, there is a risk that the stray capacitance between the patterns may affect the capacitance of the variable capacitor. The configuration of this embodiment, however, can prevent such a trouble.

In the state where the holder 51 and the circuit connecting member 52 are fitted and engaged with each other in this way, laser welding is made through laser light radiation at a plurality of positions in the coupling portion in which the holder 51 and the circuit connecting member 52 fitted to each other partially overlap each other. In this case, at each laser light radiation position in the coupling portion between the holder 51 and the circuit connecting member 52, the holder 51 and the circuit connecting member 52 are melted to be firmly attached to each other. The holder 51 and the circuit connecting member 52 are welded at several points, that is, the holder 51 and the circuit connecting member 52 are welded in a point region being a small region irradiated with laser light, with the result that a laser welded portion is formed.

In this embodiment, as illustrated in FIG. 3A, in the region of a 180-degree range portion in which the recessed groove 51b of the holder 51 is seen at the center in the coupling portion between the holder 51 and the circuit connecting member 52, four laser welded portions LZa, LZb, LZc, and LZd are formed at positions that are at each end of the recessed groove 51b and shifted from the positions at which the line members 521 and 522 of the circuit connecting member 52 are present. Specifically, with the laser welded portions LZa, LZb, LZc, and LZd formed at the positions shifted from the positions at which the line members 521 and 522 of the circuit connecting member 52 are present, the line members 521 and 522 are not irradiated with laser light. This prevents a trouble in that the line member 521 is divided through laser light radiation on the line member 521, for example.

In this case, when the pen pressure detecting module 5 is seen from the printed circuit board 6 side, the two laser welded portions LZa and LZb are formed along the recessed groove 51b (parallel to the recessed groove 51b) on the right side of the recessed groove 51b at the two positions shifted from each other in the axial direction. The remaining two laser welded portions LZc and LZd are formed along the recessed groove 51b (parallel to the recessed groove 51b) on the left side of the recessed groove 51b at the two positions shifted from each other in the axial direction. This means that the two laser welded portions LZa and LZb and the two laser welded portions LZc and LZd are provided while being separated from each other in a direction intersecting with the axial direction (the orthogonal direction in this example) across the recessed groove 51b, specifically, in the circumferential direction of the pen pressure detecting module 5.

Moreover, in this example, in the coupling portion between the holder 51 and the circuit connecting member 52, in the region of a 180-degree range portion illustrated in FIG. 3B, which is obtained by rotating the state in FIG. 3A by 180°, four laser welded portions LZe, LZf, LZg, and LZh are formed at positions shifted from each other in the direction intersecting with the axial direction (the orthogonal direction in this example), specifically, in the circumferential direction of the pen pressure detecting module 5, and in the axial direction. Of the four laser welded portions LZe, LZf, LZg, and LZh, the two laser welded portions LZe and LZf are formed in parallel to the recessed groove 51b at the positions shifted from each other in the axial direction. Further, the two laser welded portions LZg and LZh are formed in parallel to the recessed groove 51b at the positions shifted from each other in the axial direction. The two laser welded portions LZe and LZf and the two laser welded portions LZg and LZh are provided while being separated from each other in the circumferential direction of the pen pressure detecting module 5.

Moreover, in this embodiment, the plurality of laser welded portions are formed at the positions opposite to each other in the direction intersecting with the axial direction in the coupling portion between the holder 51 and the circuit connecting member 52. In this example, the two laser welded portions LZa and LZb and the two laser welded portions LZg and LZh are provided at the positions opposite to each other in the radial direction of the pen pressure detecting module 5 (the direction orthogonal to the axial direction). The two laser welded portions LZc and LZd and the two laser welded portions LZe and LZf are provided at the positions opposite to each other in the radial direction of the pen pressure detecting module 5 (the direction orthogonal to the axial direction).

The pen pressure detecting module 5 is assembled in this way. Next, the ferrite core 42 of the coil member 4 is fitted to the fitting recessed portion 51a of the holder 51. Moreover, the one end portion 41a and the other end portion 41b of the coil 41 of the coil member 4 are housed in the recessed groove 51b of the holder 51 and extended to the circuit connecting member 52. Moreover, the one end portion 41a and the other end portion 41b of the coil 41 of the coil member 4 are soldered to the respective land patterns 521L and 522L of the line members 521 and 522 of the circuit connecting member 52.

Next, into the recessed groove 52f between the protruded portions 52g and 52h of the holding connection portion 52e of the circuit connecting member 52, the longitudinal end portion of the printed circuit board 6 on which the conductive patterns 61 and 62 have been formed is inserted. Moreover, the connection patterns 521P and 522P of the line members 521 and 522 formed on the end portion of the protruded portion 52g of the holding connection portion 52e of the circuit connecting member 52 are soldered to the conductive patterns 61 and 62 of the printed circuit board 6, to thereby be electrically connected thereto. The printed circuit board 6 is held by the holding connection portion 52e as a result.

In this way, the assembly of the parts that are housed in the electronic pen 1 is complete. The electronic pen module component, which is a module obtained as a result of completion of the assembly, is housed in the casing 2 so as not to move in the axial direction with the coil member 4 side being the pen point side of the casing 2. The side opposite to the pen point side of the casing 2 is closed by the casing cap 21, for example. Moreover, the core 3 is inserted from the pen point-side opening of the casing 2. Through the through hole 42a of the ferrite core 42 of the coil member 4, the end portion of the core main body portion 31 of the core 3 is press-fitted to the recessed hole 55a of the pusher member 55 of the pressure sensor 54 of the pen pressure detecting module 5. The electronic pen 1 is complete in this way.

Note that, in the above description, after the holder 51 and the circuit connecting member 52 are fitted and coupled to each other, laser welded portions are formed at a plurality of positions in the coupling portion, and thereafter, the coil member 4 and the printed circuit board 6 are coupled to the pen pressure detecting module 5. The coil member 4 and the printed circuit board 6 may, however, be coupled to the pen pressure detecting module 5 before laser welding.

Further, in the above description, the coil portion is coupled to the pen pressure detecting module 5 and the printed circuit board 6 is then coupled to the pen pressure detecting module 5, but the printed circuit board 6 may be coupled first. Alternatively, the coil portion and the printed circuit board 6 may be simultaneously coupled to the pen pressure detecting module 5 if possible.

[Configuration Examples of Electronic Circuits of Electronic Pen 1 and Position Detecting Device 202]

Figure 6:
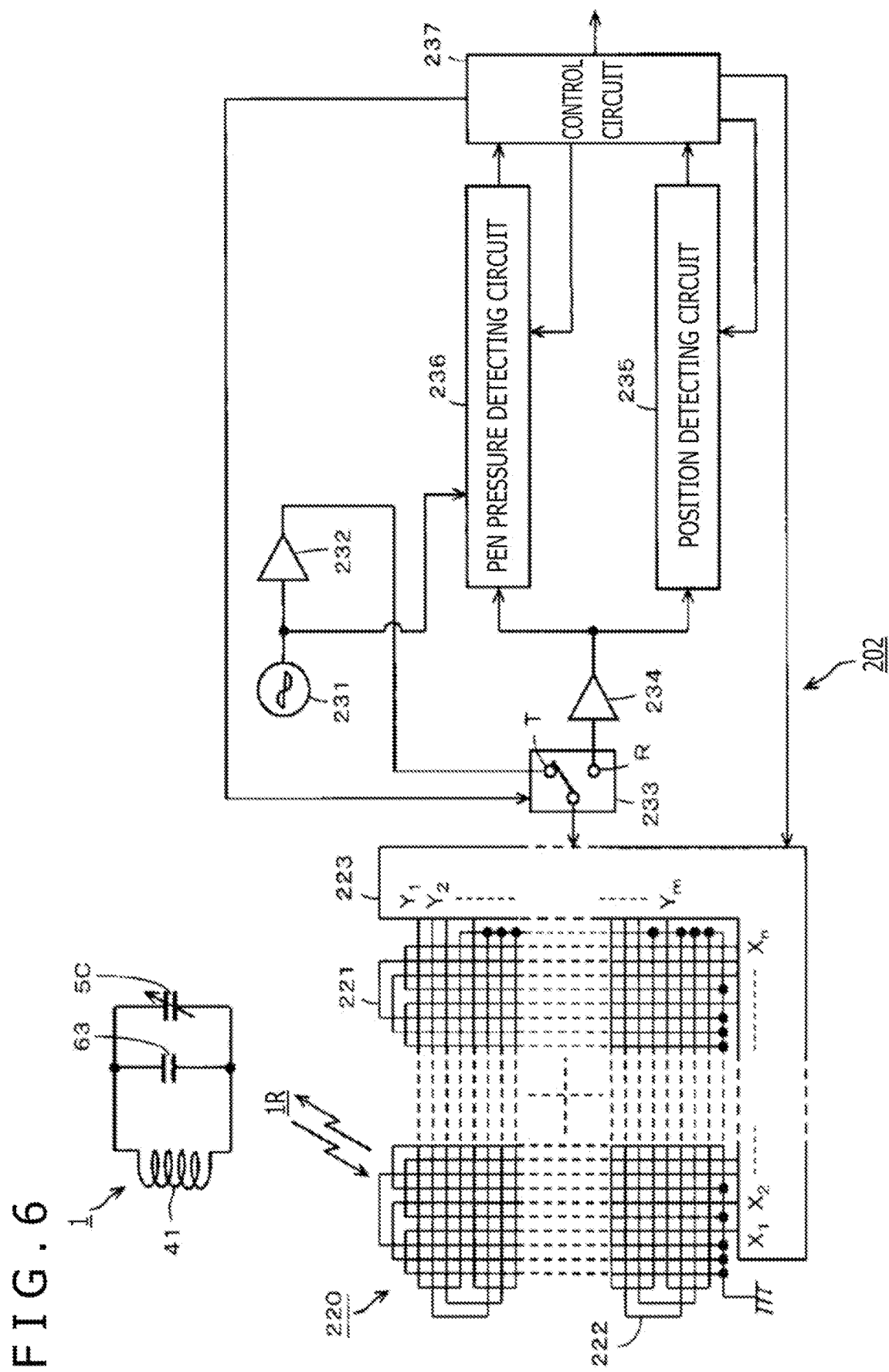
FIG. 6 is a diagram illustrating configuration examples of electronic circuits of the electronic pen according to the first embodiment of the present disclosure and a position detecting device.

FIG. 6 is a diagram illustrating configurations of an electronic circuit of the electronic pen 1 and an electronic circuit of the position detecting device 202 that is used together with the electronic pen 1.

As illustrated in FIG. 6, in the electronic pen 1, the one end portion 41a and the other end portion 41b of the coil 41 and the capacitor 63 are connected to each other through the line members 521 and 522 of the circuit connecting member 52, to thereby form a parallel resonance circuit 1R. In addition, since the first electrode and the second electrode of a variable capacitor 5C, which includes the pressure sensor 54 of the pen pressure detecting module 5, are connected to the land patterns 521L and 522L of the line members 521 and 522, the variable capacitor 5C is further connected to the parallel resonance circuit 1R, which includes the coil 41 and the capacitor 63, in parallel.

When pressure (pen pressure) is applied to the distal end portion 32 of the core 3, the pusher member 55 pushes the conductive elastic body 543 to bring the conductive elastic body 543 into contact with the dielectric 541 through the spacer 542. A contact area between the conductive elastic body 543 and the dielectric 541 depends on pressure (pen pressure) that is applied to the distal end portion 32 of the core 3. The capacitance of the variable capacitor 5C depends on a contact area between the conductive elastic body 543 and the dielectric 541, and thus depends on pressure (pen pressure) that is applied to the distal end portion 32 of the core 3.

The electromagnetic induction position detecting device 202 of this embodiment transmits a signal to the electronic pen 1 by electromagnetic coupling, and the electronic pen 1 feeds back the signal received from the position detecting device 202 through the resonance circuit.

The position detecting device 202 receives the feedback signal from the resonance circuit 1R of the electronic pen 1 by electromagnetic coupling. The position detecting device 202 detects a position on a sensor 220 indicated by the electronic pen 1 from a position on the sensor at which the received signal is detected. The position detecting device 202 detects a phase change of the signal received from the resonance circuit 1R of the electronic pen 1 by electromagnetic coupling to detect a change in resonance frequency, to thereby detect pen pressure applied to the core 3 of the electronic pen 1.

The position detecting device 202 includes the sensor 220 including a position detecting coil including an X-axis direction loop coil group 221 and a Y-axis direction loop coil group 222 stacked. Further, the position detecting device 202 includes a selection circuit 223 to which the X-axis direction loop coil group 221 and the Y-axis direction loop coil group 222 are connected. The selection circuit 223 successively selects one of the two loop coil groups 221 and 222.

Further, the position detecting device 202 includes an oscillator 231, a current driver 232, a switching circuit 233, a reception amplifier 234, a position detecting circuit 235, a pen pressure detecting circuit 236, and a control circuit 237. The control circuit 237 includes a microcomputer. The control circuit 237 controls loop coil selection by the selection circuit 223 and switching by the switching circuit 233, and controls timing of processing by the position detecting circuit 235 and the pen pressure detecting circuit 236.

The oscillator 231 generates an alternate current (AC) signal having a frequency f0. Moreover, the oscillator 231 supplies the generated AC signal to the current driver 232 and the pen pressure detecting circuit 236. The current driver 232 converts the AC signal supplied from the oscillator 231 into current, and sends the current to the switching circuit 233. The switching circuit 233 switches, under control by the control circuit 237, a connection destination to which a loop coil selected by the selection circuit 223 is connected (transmission-side terminal T or reception-side terminal R). Of the connection destinations, the current driver 232 is connected to the transmission-side terminal T, and the reception amplifier 234 is connected to the reception-side terminal R.

An induced voltage that is generated at the loop coil selected by the selection circuit 223 is sent to the reception amplifier 234 through the selection circuit 223 and the switching circuit 233. The reception amplifier 234 amplifies the induced voltage supplied from the loop coil, and sends the resultant to the position detecting circuit 235 and the pen pressure detecting circuit 236.

At each loop coil of the X-axis direction loop coil group 221 and the Y-axis direction loop coil group 222, an induced voltage is generated with a radio wave that is transmitted from the electronic pen 1. The position detecting circuit 235 detects an induced voltage generated at each loop coil, specifically, a received signal, and converts the detection output signal into a digital signal to output the digital signal to the control circuit 237. The control circuit 237 calculates a coordinate value of an indicated position in the X-axis direction and the Y-axis direction of the electronic pen 1 based on the digital signal from the position detecting circuit 235, specifically, the voltage value level of the induced voltage generated at each loop coil.

Meanwhile, the pen pressure detecting circuit 236 synchronously detects the output signal from the reception amplifier 234 with the AC signal from the oscillator 231 to obtain a signal at a level depending on a phase difference (frequency shift) therebetween, and converts the signal depending on the phase difference (frequency shift) into a digital signal to output the digital signal to the control circuit 237. The control circuit 237 detects pen pressure applied to the electronic pen 1 based on of the level of the digital signal from the pen pressure detecting circuit 236, specifically, the signal depending on the phase difference (frequency shift) between the transmitted radio wave and the received radio wave.

[Effect of Electronic Pen 1 of First Embodiment]

As described above, according to the electronic pen 1 of the above-mentioned embodiment, in the pen pressure detecting module 5, the holder 51 and the circuit connecting member 52 are fitted and coupled to each other while partially overlapping each other, and laser welding is then made at the coupling portion in which the components partially overlap each other. Consequently, as compared to a case where the holder 51 and the circuit connecting member 52 are simply fitted and coupled to each other, the holder 51 and the circuit connecting member 52 can be firmly coupled to each other.

According to the electronic pen 1 of the above-mentioned embodiment, no adhesive is required, and hence, fitting between the holder 51 and the circuit connecting member 52 is easy, which facilitates mass production.

Second Embodiment

The electronic pen 1 of the first embodiment described above corresponds to a case where the present disclosure is applied to an electromagnetic induction electronic pen. However, the present disclosure is also applicable to an active electrostatic electronic pen. An electronic pen 1A of a second embodiment that corresponds to a case where the present disclosure is applied to an active electrostatic electronic pen is now described with reference to FIG. 7A, and FIG. 7B to FIG. 9.

FIG. 7A is a view illustrating a part of an embodiment of the electronic pen 1A of the second embodiment, and is a sectional view illustrating an example of the detailed configuration of a coupling portion between a core-side component 7 including a conductive core 3A and a pen pressure detecting module 5A. FIG. 7B and FIG. 7C are views illustrating an example of a terminal member 8 for electrical coupling between the conductive core 3A and a signal transmitting circuit formed on a printed circuit board 6A coupled to and held by a circuit connecting member 52A of the pen pressure detecting module 5A. FIG. 7B is a plan view of the terminal member 8, and FIG. 7C is a side view of the terminal member 8. In addition, FIG. 7D is a view illustrating a part of the circuit connecting member 52A of the pen pressure detecting module 5A.

In the description of the second embodiment, the same components as the first embodiment described above are denoted by the same reference symbols, so that detailed description thereof is omitted. Further, components that correspond to the components of the first embodiment but have slightly different configurations from the first embodiment are denoted by the same reference symbols with a suffix A.

In the electronic pen 1A of the second embodiment, to the axial pen point side of a holder 51A of the pen pressure detecting module 5A, the core-side component 7 including the core 3A made of a conductive material and a shielding member 70 is coupled instead of the coil member 4 of the electronic pen 1 of the first embodiment.

Further, in the electronic pen 1A of the second embodiment, on the printed circuit board 6A that is coupled to the circuit connecting member 52A on the side opposite to the axial pen point of the pen pressure detecting module 5A, an electronic circuit (not illustrated in FIG. 7D) configured to transmit signals to a position detecting device through the conductive core 3A is mounted.

Moreover, in the pen pressure detecting module 5A of the electronic pen 1A of the second embodiment, a component for electrical connection between the core-side component 7 and the printed circuit board 6A is different from that of the pen pressure detecting module 5 of the first embodiment. The remaining configuration of the pen pressure detecting module 5A of the second embodiment is similar to that of the pen pressure detecting module 5 of the first embodiment.

The core 3A includes, as illustrated in FIG. 7A, a core main body portion 31A made of a conductive material, for example, metal formed to have a diameter of 1.9 mm, for example. In this embodiment, approximately half on the pen point side of the core main body portion 31A is covered with a protective member 32A made of an insulating material. The protective member 32A has roles of preventing the sensor input surface of the position detecting device from being damaged and of increasing a contact area with the sensor input surface.

As illustrated in FIG. 7A, the shielding member 70 of the core-side component 7 is made of a conductive material covered with an insulating layer.

Moreover, the end portion on the side opposite to the pen point side of the shielding member 70 is fitted to a fitting recessed portion 51Aa of the holder 51A of the pen pressure detecting module 5A to be held by the holder 51A. However, in the second embodiment, in the bottom portion of the fitting recessed portion 51Aa of the holder 51A, the terminal member 8 for electrically connecting the conductive core 3A and the electronic circuit of the printed circuit board 6A to each other is provided as illustrated in FIG. 7A.

The terminal member 8 is made of a conductive member, for example, conductive metal. As illustrated in FIG. 7B, the terminal member 8 includes a disc-like plate portion 81 that is placed in the bottom portion of the fitting recessed portion 51Aa of the holder 51A. As illustrated in FIG. 7A to FIG. 7D, the terminal member 8 includes an exposed portion 82 that is extended along the side wall surface of the fitting recessed portion 51Aa to the outer surface of the holder 51A to be exposed. In the case of this example, although not illustrated, the exposed portion 82 of the terminal member 8 is placed to be exposed at the position of the recessed groove 51b (not illustrated in FIG. 7A to FIG. 7D) of the holder 51A of the pen pressure detecting module 5A.

As illustrated in FIG. 7A to FIG. 7D, at the center of the disc-like plate portion 81 of the terminal member 8, a recessed hole 81a having substantially the same diameter as the core main body portion 31A of the core 3A is formed. The core main body portion 31A of the core 3A is made to pass through the recessed hole 81a of the terminal member 8 while being contact therewith, and an end portion 31Aa of the core main body portion 31A is then fitted to the recessed hole 55a of the pusher member 55 of the pen pressure detector 53. Here, the core 3A is pulled with predetermined force, so that coupling between the core 3A and the pusher member 55 and engagement between the core 3A and the terminal member 8 are released. As a result, the core 3A can be pulled out. That is, the core 3A is replaceable.

As illustrated in FIG. 7D, in the large-diameter portion 52d of the circuit connecting member 52A of the pen pressure detecting module 5A of the electronic pen 1A of the second embodiment, land patterns 527 and 528 are formed in addition to the land patterns 521L and 522L of the line members 521 and 522. In this example, the land patterns 527 and 528 are separately formed between the land patterns 521L and 522L so as to be parallel to the land patterns 521L and 522L as illustrated in FIG. 7D.

Moreover, in this example, from the land patterns 527 and 528, extended patterns are formed in parallel to the line members 521 and 522 to the end portion of an axial protruded portion 52Ag of the circuit connecting member 52A. The printed circuit board 6A is inserted into the recessed groove 52f between the axial protruded portion 52Ag and the axial protruded portion 52h as illustrated in FIG. 7D.

In this embodiment, one end of a lead wire 83 is mounted on the exposed portion 82 of the terminal member 8 by soldering, for example, as illustrated in FIG. 7A. The lead wire 83 is housed in the recessed groove 51b of the holder 51A and extended to the land pattern 527 of the circuit connecting member 52A, for example. The other end portion of the lead wire 83 is soldered to the land pattern 527.

Further, a terminal portion 73 is provided to the shielding member 70 as illustrated in FIG. 7A. Moreover, one end of a lead wire 74 is mounted on the terminal portion 73 by soldering, for example. The lead wire 74 is housed in the recessed groove 51b of the holder 51A and extended to the land pattern 528 of the circuit connecting member 52A, for example. The other end portion of the lead wire 74 is soldered to the land pattern 528.

Moreover, although not illustrated, to a conductor pattern connected to the electronic circuit formed on the printed circuit board 6A, the line members 521 and 522 and the extended patterns led from the land patterns 527 and 528 are soldered. With this, an electronic circuit as illustrated in FIG. 8 is formed in the electronic pen 1A.

Also in the configuration in FIG. 7A, when pen pressure is applied to the core 3A, with the pen pressure, the pusher member 55 is displaced to push the conductive elastic body 543 toward the dielectric 541 through the spacer 542. With this, also in the pen pressure detecting module 5A, the capacitance of the variable capacitor 5C changes depending on pen pressure as in the first embodiment.

[Description of Configuration Example of Electronic Circuit of Electronic Pen 1A of Second Embodiment]

Figure 8:
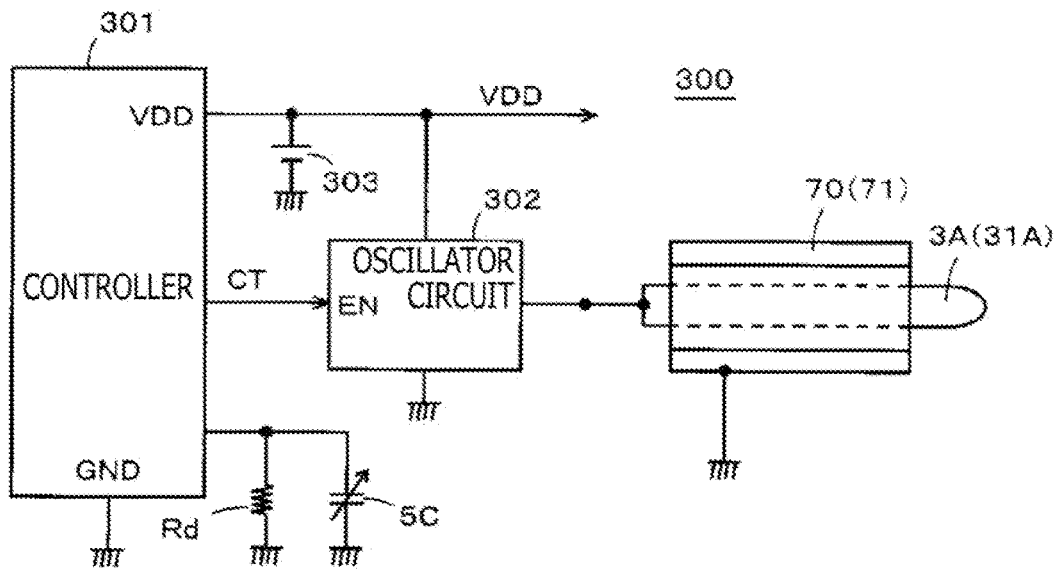
FIG. 8 is a diagram illustrating a configuration example of an electronic circuit of the electronic pen according to the second embodiment of the present disclosure.

FIG. 8 is a circuit configuration diagram of a signal transmission control circuit 300 including the electronic circuit of the electronic pen 1A of the second embodiment. Specifically, the signal transmission control circuit 300 in this example includes a controller 301 and an oscillator circuit 302.

The controller 301 includes, for example, a microprocessor, and is a control circuit configured to control operation of the signal transmission control circuit 300 of the electronic pen 1A. The controller 301 is supplied with a power-supply voltage VDD from a battery 303 that is an example of a driving power supply. The controller 301 controls the oscillator circuit 302.

One of the line members 521 and 522 of the circuit connecting member 52A is connected to the controller 301, and the other is grounded. Specifically, the variable capacitor 5C including the pen pressure detector 53 is connected to the controller 301. The controller 301 monitors the capacitance of the variable capacitor 5C, to thereby detect pen pressure that is applied to the core 3A of the electronic pen 1A. In this example, a discharging resistor Rd is connected to the variable capacitor 5C. The controller 301 detects the capacitance of the variable capacitor 5C by measuring discharge time required for the variable capacitor 5C from being in a full charge state to take a predetermined end-to-end voltage, to thereby detect pen pressure from the detected capacitance.

The oscillator circuit 302 generates an AC signal having a predetermined frequency and is supplied with the power-supply voltage VDD from the battery 303. The continuous wave of the AC signal having predetermined time from the oscillator circuit 302, specifically, a burst signal serves as a position detecting signal that is sent to a sensor of the position detecting device.

The controller 301 supplies a control signal (enable signal CT) to an enable terminal EN of the oscillator circuit 302 to turn on or off the oscillator circuit 302, thereby making the oscillator circuit 302 generate the burst signal and an amplitude shift keying (ASK) modulation signal. The oscillator circuit 302 generates an AC signal as an intermittent signal depending on the enable signal CT from the controller 301. With this, the oscillator circuit 302 can generate a burst signal and an ASK modulation signal. In this example, the controller 301 converts a detected pen pressure value into a digital signal and controls the oscillator circuit 302 depending on the digital signal, so that the oscillator circuit 302 outputs information on the pen pressure value as an ASK modulation signal.

The output end of the oscillator circuit 302 is connected to the extended pattern of the land pattern 527 of the circuit connecting member 52A. Specifically, in this embodiment, the output end of the oscillator circuit 302 is connected to the conductive core main body portion 31A of the core 3A, and an AC signal from the oscillator circuit 302 is sent to the sensor of the position detecting device through the conductive core main body portion 31A of the core 3A. Moreover, in this example, the extended pattern of the land pattern 528 of the circuit connecting member 52A electrically connected to the shielding member 70 is grounded as illustrated in FIG. 8.

[Description of Configuration Example of Position Detecting Device of Second Embodiment]

Figure 9:
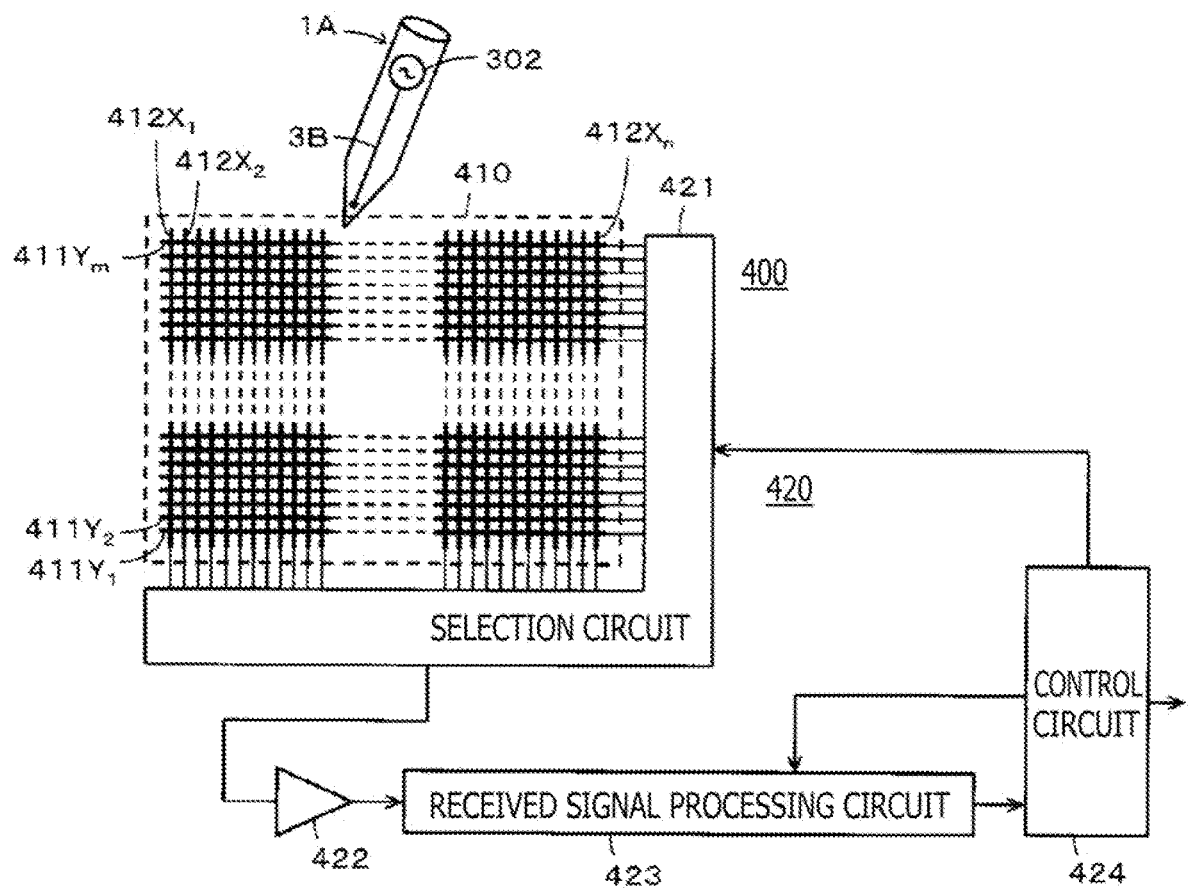
FIG. 9 is a diagram illustrating a configuration example of an electronic circuit of a position detecting device that is used together with the electronic pen according to the second embodiment of the present disclosure.

An electrostatic position detecting device 400 that is used together with the electronic pen 1A of the second embodiment includes, as illustrated in FIG. 9, a sensor 410 of the position detecting device 400 and a pen indication detecting circuit 420 that is connected to the sensor 410.

The sensor 410 is formed by stacking, in order from a lower layer side, a first conductor group including a plurality of first conductors extended in a crosswise direction (X-axis direction), an insulating layer (not illustrated), and a second conductor group including a plurality of first conductors extended in a lengthwise direction (Y-axis direction).

In this way, the sensor 410 of the position detecting device 400 has a configuration that detects a position indicated by the electronic pen 1 using the sensor pattern including the first conductor group and the second conductor group crossing each other.

In the position detecting device 400 of this embodiment, the sensor 410 has a sensor surface (indication input surface) having a size corresponding to the size of a display screen of an electronic device, for example, a tablet type information terminal, and includes the first conductor group and the second conductor group that have optical transparency.

The pen indication detecting circuit 420 includes a selection circuit 421 serving as an input-output interface with the sensor 410, an amplifier circuit 422, a received signal processing circuit 423, and a control circuit 424. The control circuit 424 supplies control signals to the selection circuit 421 and the received signal processing circuit 423.

The selection circuit 421 selects one conductor from each of the first conductor group and the second conductor group based on the control signal from the control circuit 424. The conductors selected by the selection circuit 421 are connected to the amplifier circuit 422, and a signal from the electronic pen 1A is detected by the selected conductors to be amplified by the amplifier circuit 422. The output of the amplifier circuit 422 is supplied to the received signal processing circuit 423.

The received signal processing circuit 423 only extracts, from the output of the amplifier circuit 422, a frequency component of the signal transmitted from the electronic pen 1A to detect the extracted component. The received signal processing circuit 423 converts the detection output into a digital signal to supply the digital signal to the control circuit 424.

The control circuit 424 calculates a position coordinate on the sensor 410 indicated by the electronic pen 1A based on the digital data from the received signal processing circuit 423, and outputs the position coordinate data to, for example, another processing processor of the electronic device, which is a tablet type information terminal, for example. Further, the control circuit 424 detects, as a digital signal, an ASK signal that is sent from the electronic pen 1A successively to the position indicating signal, to thereby detect pen pressure applied to the core 3A of the electronic pen 1A.

Another Embodiment or Modified Example

Note that, in the first embodiment and the second embodiment described above, the line members 521 and 522 or the land patterns 527 and 528 of the circuit connecting member 52 or 52A of the pen pressure detecting module 5 or 5A are collectively arranged in one place in the circumferential direction of the pen pressure detecting module 5 or 5A, one recessed groove 51*b* is provided in the axial direction of the holder 51, and the laser welded portions are formed at the positions other than such components.

However, the line members 521 and 522 or the land patterns 527 and 528 of the circuit connecting member 52 or 52A of the pen pressure detecting module 5 or 5A are not necessarily collectively arranged in one place in the circumferential direction of the pen pressure detecting module 5 or 5A, and may be arranged at a plurality of locations in the circumferential direction of the pen pressure detecting module 5 or 5A in a distributed manner. In such a case, the laser welded portions are formed at positions other than the distributed plurality of locations and between the plurality of locations.

FIG. 10A and FIG. 10B illustrate a pen pressure detecting module of a modified example that is used in the electromagnetic induction electronic pen 1 of the first embodiment. In a pen pressure detecting module 5B in this example, a holder 51B has individual recessed grooves, namely, a recessed groove 51Bb1 for a line member 521B and a recessed groove 51Bb2 for a line member 522B. Moreover, in this case, a separation distance between the recessed groove 51Bb1 and the recessed groove 51Bb2 in the circumferential direction is a distance that allows laser welded portions to be formed without affecting the line members 521 and 522.

Moreover, in the pen pressure detecting module 5B in this example, as illustrated in FIG. 10A, laser is radiated on a central portion of the separation distance in the circumferential direction between the recessed groove 51Bb1 and the recessed groove 51Bb2 in a coupling portion between the holder 51B and a circuit connecting member 52B, to thereby form a laser welded portion LZi. Further, as illustrated in FIG. 10B, laser is also radiated on the side opposite to the laser welded portion LZi in a direction orthogonal to the axial direction in the coupling portion between the holder 51B and the circuit connecting member 52B, to thereby form a laser welded portion LZj.

Moreover, the one end portion 41*a* of the coil 41 of the coil member 4 that is fitted to the pen point side of the holder 51B is housed in the recessed groove 51Bb1 to be led to a land pattern 521BL of the line member 521B, thereby being soldered thereto, for example. Further, the other end portion 41*b* of the coil 41 is housed in the recessed groove 51Bb2 to be led to a land pattern 522BL of the line member 522B, thereby being soldered thereto, for example.

In the examples of FIG. 10A to FIG. 10C, by laser welding, the laser welded portions LZi and LZj are formed at the respective positions opposite to each other, but a plurality of laser welded portions may be provided in the axial direction at each of positions opposite to each other. Further, at each of positions opposite to each other, a plurality of laser welded portions may be provided in the direction intersecting with the axial direction, that is, in the circumferential direction. In the case where a plurality of laser welded portions are provided in the direction intersecting with the axial direction, that is, in the circumferential direction, positions at which the laser welded portions are provided may not be opposite to each other. In addition, as with the pen pressure detecting module 5 of the first embodiment, a plurality of laser welded portions may be provided at each of positions opposite to each other in the axial direction and the direction intersecting with the axial direction (circumferential direction). Note that the examples of FIG. 10A to FIG. 10C are also applicable to the electronic pen 1A of the second embodiment.

Further, in the above-mentioned embodiments, the pen pressure detecting module 5, 5A, or 5B to which the coil member 4 or the core-side component 7 and the printed circuit board 6 or 6A are coupled is housed in the tubular casing 2, to thereby form the electronic pen 1 or 1A. However, the pen pressure detecting module 5, 5A, or 5B to which the coil member 4 or the core-side component 7 and the printed circuit board 6 or 6A are coupled can be housed in a tubular internal casing 9 to form a cartridge for an electronic pen, and the cartridge for an electronic pen can be housed in the casing 2 (external casing) as illustrated in FIG. 10C.

Note that the example of the cartridge for an electronic pen in the example of FIG. 10C is for the case of the electromagnetic induction electronic pen of the first embodiment. The active electrostatic electronic pen 1A of the second embodiment can, however, take a similar configuration including the electronic pen parts housed in the internal casing. Note that, in the example of the cartridge for an electronic pen in the example of FIG. 10C, the coil member 4 is not housed in the internal casing 9, but the parts including the coil member 4 may be housed in the internal casing 9. In the case of the active electrostatic electronic pen of the second embodiment, the core-side component 7 may preferably be housed in the internal casing 9.

Other Modified Examples

Note that, in the examples described above, the first coupling member is the holder 51, 51A, or 51B of the pen pressure detecting module 5, 5A, or 5B, and the second coupling member is the circuit connecting member 52, 52A, or 52B. However, the first coupling member and the second coupling member are not limited to members obtained through division of a pen pressure detecting module into two in the axial direction as in the examples, and may be any kinds of members that are members of an electronic pen and coupled to each other in the axial direction.

For example, members of an electronic pen may be two members of a member including a core-side component and a member holding a printed circuit board, and the two members may be coupled to each other with the member including the core-side component serving as the first coupling member and the member holding the printed circuit board serving as the second coupling member.

Note that, in the examples described above, the pen pressure detector includes the dielectric, the spacer, the conductive elastic body, and the pusher member. However, a unit which houses, as a package component, a pressure-sensitive chip including a micro electro mechanical system (MEMS) element whose capacitance changes depending on applied pressure may be used as disclosed in Japanese Patent Laid-open No. 2013-161307, for example.

Further, the pen pressure detector may have a configuration of a variable inductor instead of a configuration of a variable capacitor.

Further, needless to say, the electronic pen of the present disclosure is applicable to a device not having a pen pressure detecting function.

Further, the welded portions, which are formed in the coupling portion between the first coupling member and the second coupling member by laser welding in the embodiments described above, may be formed by another welding method. For example, the welded portions may be formed by thermal welding. In short, in the present disclosure, it is only necessary that after the first coupling member and the second coupling member are fitted and coupled to each other, the coupling portion be welded by an external stimulus.

It is to be noted that the embodiments of the present disclosure are not limited to the foregoing embodiments, and that various changes can be made without departing from the spirit of the present disclosure.

What is claimed is:

1. An electronic pen, comprising:
a tubular casing; and
a first coupling member and a second coupling member that are coupled to each other in a hollow portion of the casing in an axial direction of the casing,
wherein:
in the axial direction, the first coupling member and the second coupling member are coupled to each other while partially overlapping each other,
in a coupling portion between the first coupling member and the second coupling member, a welded portion that attaches the first coupling member and the second coupling member to each other is formed,
the first coupling member is coupled to a core-side component including a core on a side opposite to a side on which the first coupling member is coupled to the second coupling member in the axial direction,
the second coupling member holds a printed circuit board on a side opposite to a side on which the second coupling member is coupled to the first coupling member in the axial direction,
the core of the core-side component is made of a conductive material, and
the second coupling member includes a conductor that supplies, to the core, a signal from a signal transmitting circuit on the printed circuit board with a battery.

2. The electronic pen according to claim 1, wherein:
the welded portion includes a plurality of welded portions formed at plurality of positions in a direction intersecting the axial direction in the coupling portion between the first coupling member and the second coupling member.

3. The electronic pen according to claim 2, wherein:
the welded portions are formed at positions opposite to each other in the direction intersecting the axial direction in the coupling portion between the first coupling member and the second coupling member.

4. The electronic pen according to claim 1, wherein:
the welded portion includes a plurality of welded portions formed along the axial direction in the coupling portion between the first coupling member and the second coupling member.

5. The electronic pen according to claim 1, wherein:
in the coupling portion between the first coupling member and the second coupling member, inside a first one of the first coupling member and the second coupling member, a second one of the first coupling member and the second coupling member is fitted in the axial direction,
the first one of the first coupling member and the second coupling member is different from the second one of the first coupling member and the second coupling, and
the first one of the first coupling member and the second coupling member is made of a light-transmitting resin that enables welding with laser light, and the second one of the first coupling member and the second coupling member is made of a light-absorbing resin.

6. The electronic pen according to claim 5, wherein:
the first one of the first coupling member and the second coupling member is made of a transparent or translucent resin, and the second one of the first coupling member and the second coupling member is made of a colored resin.

7. The electronic pen according to claim 1, further comprising:
a pen pressure detector that is held between the first coupling member and the second coupling member in the axial direction.

8. The electronic pen according to claim 7, wherein:
the second coupling member includes a conductor that electrically connects the pen pressure detector and an electronic circuit formed on the printed circuit board.

9. The electronic pen according to claim 7, wherein:
the pen pressure detector includes:
a dielectric; and
a first electrode; and
a second electrode,
the dielectric being interposed between the first electrode and the second electrode in the axial direction, and
a capacitance between the first electrode and the second electrode changes depending on a pressure that is applied to the core.

10. The electronic pen according to claim 1, wherein:
in the second coupling member, a line portion that electrically connects a component held by at least the first coupling member or the second coupling member, and the printed circuit board, is provided, and
the welded portion is formed at a position other than the line portion.

11. The electronic pen according to claim 10, wherein:
the line portion is formed in the axial direction, and
the welded portion is formed at a position that is parallel to the line portion.

12. The electronic pen according to claim 10, wherein:
the line portion includes a plurality of line portions collectively formed in the axial direction, and
the welded portion includes a plurality of welded portions formed on two sides of the plurality of line portions collectively arranged, in parallel with the plurality of line portions.

13. An electronic pen comprising:
a tubular casing; and
a first coupling member and a second coupling member that are coupled to each other in a hollow portion of the casing in an axial direction of the casing,
wherein:
in the axial direction, the first coupling member and the second coupling member are coupled to each other while partially overlapping each other,
in a coupling portion between the first coupling member and the second coupling member, a welded portion that attaches the first coupling member and the second coupling member to each other is formed,
the first coupling member is coupled to a core-side component including a core on a side opposite to a side on which the first coupling member is coupled to the second coupling member in the axial direction,
the second coupling member holds a printed circuit board on a side opposite to a side on which the second coupling member is coupled to the first coupling member in the axial direction,
the core-side component includes the core and a coil wound around a magnetic core having a through hole through which the core is inserted, and
the second coupling member includes a conductor that electrically connects the coil and a capacitor placed on the printed circuit board with a battery to each other, and forms a resonance circuit.

14. An electronic pen comprising:
a tubular casing;
a first coupling member and a second coupling member that are coupled to each other in a hollow portion of the casing in an axial direction of the casing; and
a pen pressure detector that is held between the first coupling member and the second coupling member in the axial direction,
wherein:
in the axial direction, the first coupling member and the second coupling member are coupled to each other while partially overlapping each other,
in a coupling portion between the first coupling member and the second coupling member, a welded portion that attaches the first coupling member and the second coupling member to each other is formed,
the pen pressure detector includes:
a dielectric; and
a first electrode; and
a second electrode,
the dielectric being interposed between the first electrode and the second electrode in the axial direction, and
a capacitance between the first electrode and the second electrode changes depending on a pressure that is applied to the core,
on an end surface of a side of the second coupling member that faces the first coupling member,
a first conductor is disposed, the first conductor contacting and electrically connecting a first one of the first electrode and the second electrode that is on a side of the dielectric that faces the second coupling member, and
a second conductor is disposed, the second conductor contacting and electrically connecting a second one of the first electrode and the second electrode that is on a side opposite to the side of the dielectric that faces the second coupling member, at a position shifted from a position of the first conductor in the axial direction and a direction orthogonal to the axial direction,
the first one of the first coupling member and the second coupling member being different from the second one of the first coupling member and the second coupling, and
on the second coupling member, a first line portion and a second line portion that connect the first conductor and the second conductor to a printed circuit board with a battery are formed.

15. The electronic pen according to claim 14, wherein:
the first coupling member and the second coupling member are coupled to each other when the first one of the first coupling member and the second coupling member is fitted to the second one of the first coupling member and the second coupling member, and
the pen pressure detector abuts the second coupling member in the axial direction, and electrically couples to a conductor.

* * * * *